United States Patent
Wiley et al.

(10) Patent No.: US 10,082,304 B2
(45) Date of Patent: Sep. 25, 2018

(54) ENERGY RECOVERY VENTILATION CONTROL SYSTEM

(71) Applicant: Air Distribution Technologies IP, LLC, Milwaukee, WI (US)

(72) Inventors: Josiah Wiley, Kansas City, MO (US); Michael G. Longman, Coppell, TX (US); Sean Andrew Moody, Rancho Cucamonga, CA (US)

(73) Assignee: Air Distribution Technologies IP, LLC, Milwaukee, WI (US)

( * ) Notice: Subject to any disclaimer, the term of this patent is extended or adjusted under 35 U.S.C. 154(b) by 75 days.

(21) Appl. No.: 15/253,530

(22) Filed: Aug. 31, 2016

(65) Prior Publication Data

US 2016/0370021 A1    Dec. 22, 2016

Related U.S. Application Data

(62) Division of application No. 13/656,797, filed on Oct. 22, 2012, now Pat. No. 9,513,065.

(60) Provisional application No. 61/554,040, filed on Nov. 1, 2011.

(51) Int. Cl.

| F24F 3/14 | (2006.01) |
|---|---|
| F24F 3/147 | (2006.01) |
| F28D 21/00 | (2006.01) |
| F24F 13/22 | (2006.01) |
| F24F 11/77 | (2018.01) |
| F28D 19/04 | (2006.01) |
| F24F 110/12 | (2018.01) |
| F24F 110/22 | (2018.01) |

(52) U.S. Cl.
CPC .............. *F24F 3/147* (2013.01); *F24F 11/77* (2018.01); *F24F 13/222* (2013.01); *F28D 21/0014* (2013.01); *F24F 2110/12* (2018.01); *F24F 2110/22* (2018.01); *F24F 2203/104* (2013.01); *F28D 19/042* (2013.01)

(58) Field of Classification Search
CPC ........ F28D 19/00; F28D 19/04; F28D 19/041; F28D 19/042; F24F 2011/0013; F24F 2011/0016; F24F 2203/1032; F24F 13/222
USPC ................ 165/8, 270, 59, 10; 236/441, 44 C
See application file for complete search history.

(56) References Cited

U.S. PATENT DOCUMENTS

| 3,945,430 A | 3/1976 | van Beukering et al. |
|---|---|---|
| 4,426,853 A | 1/1984 | Mitani et al. |
| 4,497,361 A | 2/1985 | Hajicek |
| 4,924,934 A | 5/1990 | Steele |
| 5,069,272 A | 12/1991 | Chagnot |
| 5,183,098 A | 2/1993 | Chagnot |
| 5,423,187 A | 6/1995 | Fournier |

(Continued)

FOREIGN PATENT DOCUMENTS

CA     2742225     12/2011

OTHER PUBLICATIONS

The Office Action dated Jul. 22, 2014 by the Canadian Intellectual Property Office for Patent Application No. 2,793,159.

(Continued)

*Primary Examiner* — Devon Russell
(74) *Attorney, Agent, or Firm* — Fletcher Yoder, P.C.

(57) ABSTRACT

A control system comprising a temperature sensor, an enthalpy sensor and a processor capable of receiving said temperature and enthalpy signals and further capable of controlling the operation of an energy recovery ventilation wheel based at least in part on said temperature and enthalpy signals.

15 Claims, 3 Drawing Sheets

(56) References Cited

U.S. PATENT DOCUMENTS

| | | |
|---|---|---|
| 5,447,037 A | 9/1995 | Bishop |
| 5,548,970 A | 8/1996 | Cunningham et al. |
| 5,887,784 A | 3/1999 | Haas |
| 6,199,388 B1 | 3/2001 | Fischer |
| 6,575,228 B1 | 6/2003 | Ragland |
| 7,685,834 B2 | 3/2010 | Moffitt |
| 7,886,986 B2 | 2/2011 | Fischer |
| 8,621,884 B2 | 1/2014 | Stammer |
| 2010/0155045 A1 | 6/2010 | Yang |
| 2011/0308265 A1 | 12/2011 | Phannavong |

OTHER PUBLICATIONS

The Examiner's Report with Examination Search Report dated Jun. 3, 2016 by the Canadian Intellectual Property Office for Canadian application No. 2,793,159.

The Reply in response to the Examiner's Report as filed with the Canadian Intellectual Property Office dated Nov. 25, 2016 for Canadian application No. 2,793,159.

The Office Action dated Mar. 17, 2017 by the Canadian Intellectual Property Office for Patent Application No. 2,793,159.

ENERGY RECOVERY VENTILATION CONTROL SYSTEM

REFERENCE TO RELATED APPLICATIONS

This non-provisional application is a divisional patent application of Ser. No. 13/656,797 filed Oct. 22, 2012, which claims priority from U.S. provisional application Ser. No. 61/554,040 filed Nov. 1, 2011, which are hereby incorporated by reference.

BACKGROUND OF THE INVENTION

This disclosure relates generally to air handling systems for buildings, more particularly to energy recovery ventilation systems, and specifically to a temperature and/or enthalpy control for an energy recovery wheel.

The present disclosure is directed to systems and methods which control energy recovery ventilation (ERV) systems of buildings. ERV systems may be used to recover energy and lower utility expenses. Energy recovery wheels rotate between the incoming outdoor air and the exhaust air. As the wheel rotates, it transfers a percentage of the heat and moisture differential from one airstream to the other. The outdoor air is pre-conditioned reducing the capacity and energy needed from the mechanical HVAC system. According to guidelines, building environments require a specific amount of fresh air to dilute contaminates in the space and provide ventilation for high concentrations of people. The required amount of fresh air may provide dilution of contaminates, to minimize the possibility of "sick building syndrome." Increasing the outside air intake lowers the carbon dioxide levels in the building, and may help keep the occupants alert and healthier. ERVs may also reduce indoor odors with fresh outside air that is brought into the building as stale air may be exhausted out of the building.

When fresh air is brought into a building, conditioned air from the inside may be exhausted to the outside to equalize pressure. The energy of the conditioned exhaust air leaving the building may be used to pre-condition outside fresh air in the summer and winter. When conditions are suitable for free cooling in the spring and/or fall, the energy recovery ventilator enters an economizer sequence.

An energy recovery ventilation wheel (wheel) may be used within an ERV. The rotating wheel heat exchanger may be composed of a rotating cylinder filled with an air permeable material resulting in a large surface area. The surface area is the medium for the sensible and/or enthalpy energy transfer. As the wheel rotates between the ventilation and exhaust air streams it picks up heat energy and releases it into the colder air stream. The driving force behind the exchange is the difference in temperatures between the opposing air streams. Typical media used consists of polymer, aluminum, and synthetic fiber.

The enthalpy exchange is accomplished through the use of desiccants. Desiccants transfer moisture through the process of adsorption which is predominately driven by the difference in the partial pressure of vapor within the opposing air-streams. Typical desiccants consist of silica gel, and molecular sieves.

One disadvantage of using a wheel is moisture build up in and on the wheel. In one embodiment, a sequence of operation is undertaken, with inputs from the outside enthalpy and/or temperature to control the operation of the sequence.

Representative of the art is U.S. Pat. No. 6,205,797 which discloses an air conditioning system and operation method, having dehumidification ability and flexibly adaptable for processing a variety of conditioning loads, and also energy conserving. The invention comprises a desiccant for adsorbing moisture from process air, and a heat pump, including a compressor, that operates by using process air as a low-temperature heat source and regeneration air as a high-temperature heat source so as to supply heat to regeneration air for regenerating the desiccant. Processes of heat transfer in a sensible heat exchanger are made adjustable, for exchanging heat between post-desiccant process air that has not flowed into the low temperature heat source heat exchanger and pre-desiccant regeneration air that has not yet regenerated the desiccant.

SUMMARY OF THE INVENTION

A control system comprising a temperature sensor, an enthalpy sensor and a processor capable of receiving said temperature and enthalpy signals, and further capable of controlling the operation of an energy recovery ventilation wheel, based at least in part on said temperature and enthalpy signals.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. The novel features which are believed to be characteristic of the disclosure, both as to its organization and method of operation, together with further objects and advantages will be better understood from the following description when considered in connection with the accompanying figures.

BRIEF DESCRIPTION OF THE DRAWINGS

The accompanying drawings, which are incorporated in and form part of the specification in which like numerals designate like parts, illustrate embodiments of the present disclosure and together with the description, serve to explain the principles of the disclosure. It is to be expressly understood, however, that each of the figures is provided for the purpose of illustration and description only and is not intended as a definition of the limits of the present disclosure. In the drawings.

DETAILED DESCRIPTION

Figure 1:
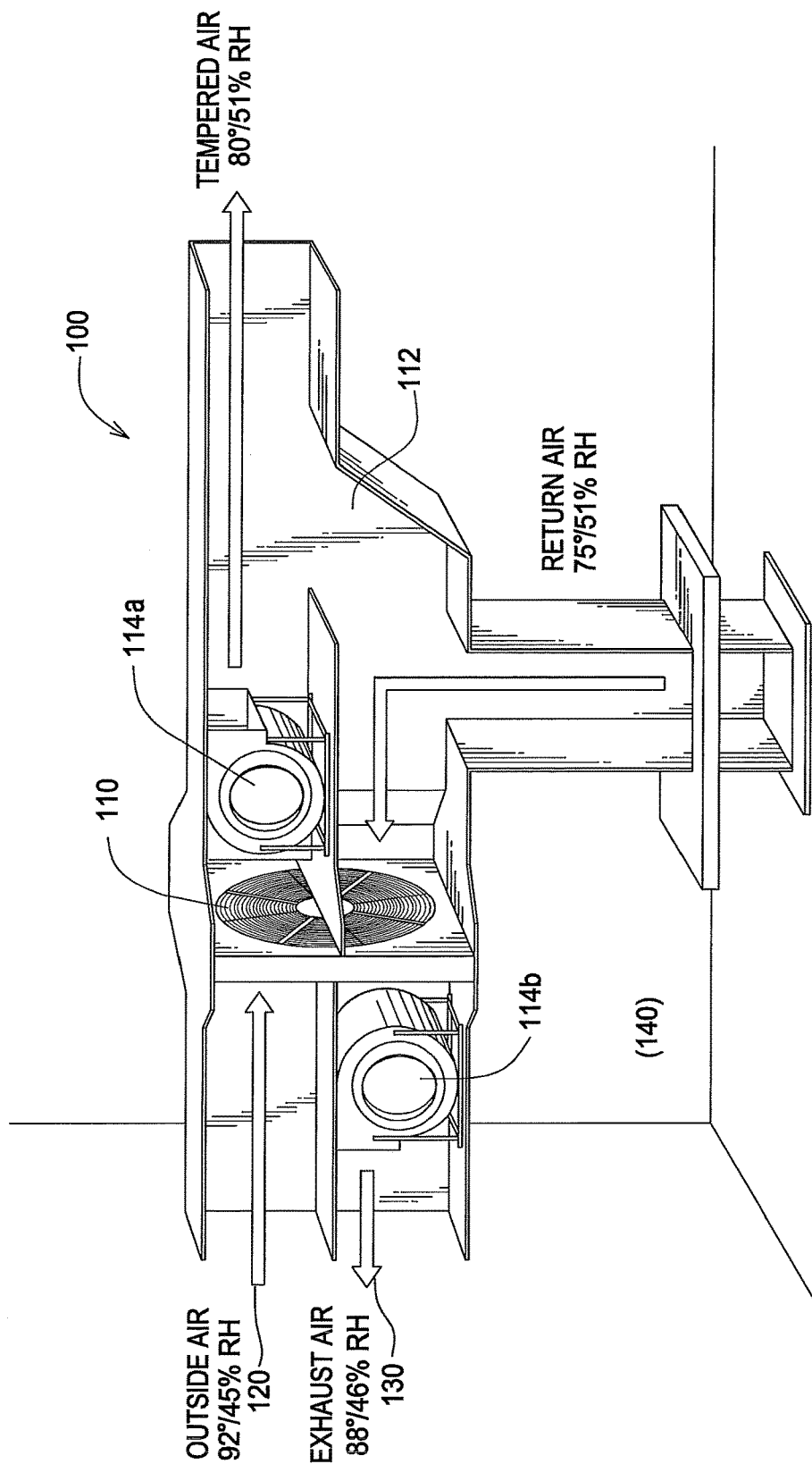
FIG. 1 is a plan view of an energy recovery ventilation system.

FIG. 1 shows a general ERV system 100. System 100 may be an air-to-air type heat exchanger. System 100 may include an energy recovery ventilation wheel, or thermal wheel, or enthalpy wheel (wheel) 110. As the wheel rotates between the ventilation 120 and exhaust air 130 streams it may pick up heat energy and release it into the colder air stream. In different seasons the inside or the outside air may have more heat or moisture or both and thereby more energy.

The system 100 in FIG. 1 may show an embodiment where the outside air 120 is warmer than the inside air 140. As can be seen, the conditioned inside air that is being exhausted 130 may be mixed with the incoming outside air 120, via a bypass opening 112 to lower the temperature and raise the relative humidity of the incoming outside air. A portion of the exhaust flow 130 may also pass thorough wheel 110 in addition to flowing through the bypass 112. Wheel 110 rotates to cool the incoming outside air. This helps reduce the amount of energy used by the air conditioning and air handling system to bring the temperature down to the set point of the system.

It will be appreciated that when the outside air is cooler and the building is to be heated, the exhausted inside air will be used to warm the incoming outside air using the wheel 110 and the bypass opening 112 to reduce power consumption of the ERV.

System 100 may also include one or more blowers 114a and 114b installed in ductwork adjacent to the wheel 110 to aid the exchange of air to and from a building (not shown) in which the system operates.

Figure 2:
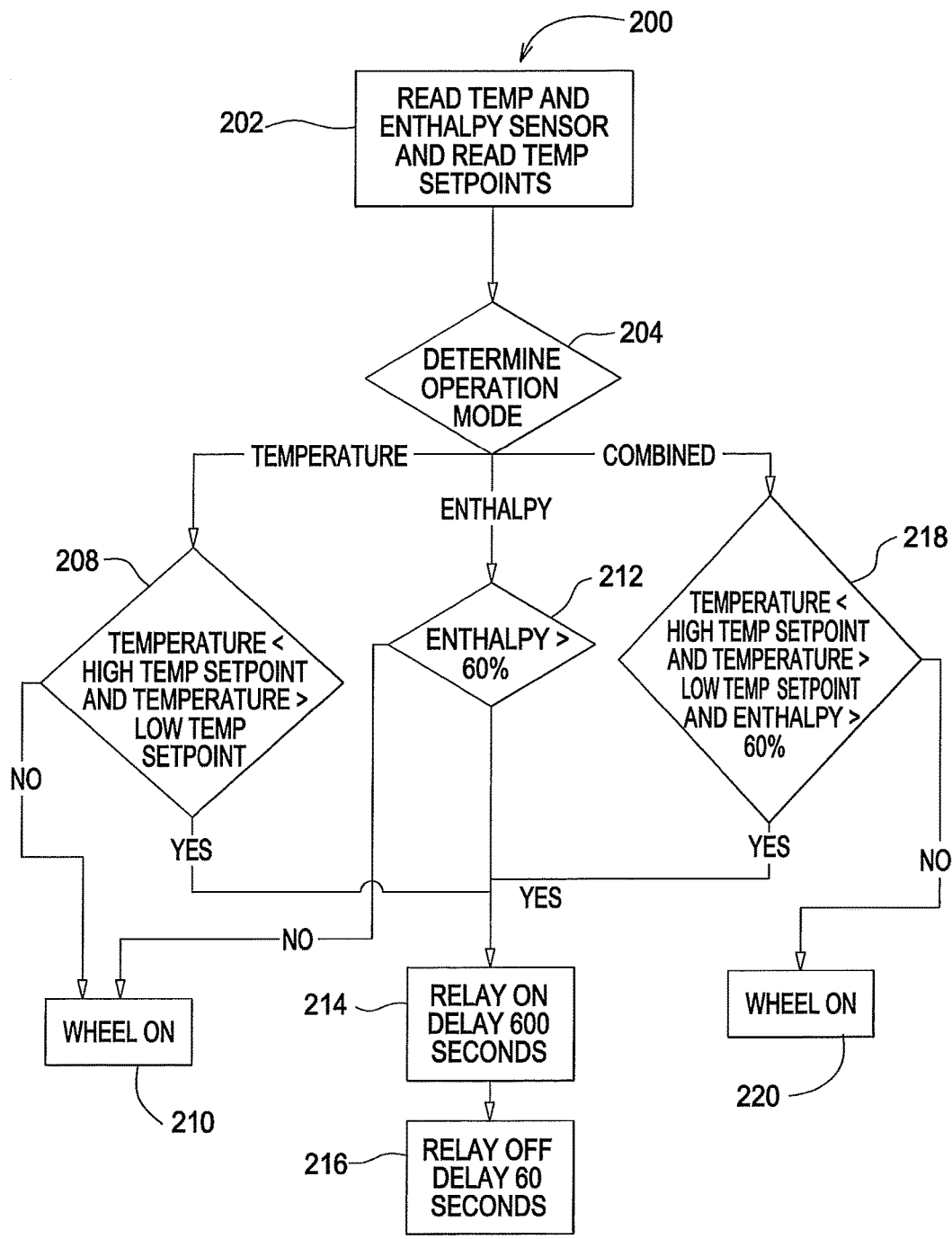
FIG. 2 is a flowchart of a method according to an embodiment.

FIG. 2 is a flow chart of a method 200 of operation of an ERV control system, according to an embodiment. Method 200 may include the step of reading the temperature and enthalpy from the respective sensors, and reading the temperature setpoints at 202. Temperature and enthalpy readings are taken at the respective sensors and are received at a controller. The temperature and enthalpy reading may be from inside or outside the ERV, but are preferably from outside air entering the ERV. Reference to the "enthalpy reading" comprises sensing the relative humidity of the air which is then combined with the temperature reading by the controller to determine an enthalpy in BTU/lbm. The enthalpy sensor may also sense both dry bulb temperature and relative humidity. Examples include Honeywell part no. C7400A.

The controller may also have setpoints for temperature. This setpoint may be entered by a user through a user interface or come preset from the factory.

Method 200 may include the step of determining the operation mode at 204. There may be different modes of operation of the system. In this embodiment, there may be a temperature based operation, and enthalpy based operation, and a combined mode of operation. It will be appreciated that there may be many other modes of operation without straying from the scope of this disclosure. The mode of operation may be selected by a user via pins and jumpers, or by another user interface. Furthermore, the mode may be determined by the sensor readings and the setpoint from 202 above.

If it is determined that the temperature mode of operation is desired, control may flow to 208 where another determination is made. At 208, a determination is made whether the temperature reading from the sensor is lower than a high setpoint, and greater than a lower setpoint. If both of these determinations are true, the relay to power the wheel is shut off for a period of time (600 seconds in this embodiment) at 214. Then the wheel is turned on for a period of time (60 seconds in this embodiment) at 216. The process may then start over at 202.

If the temperature is outside of the range defined in 208, the "NO" leg is followed and the wheel is set to "ON". The process may then start over at 202.

If it is determined at 204 that the enthalpy mode is desired, the process flows to 212. At 212 it is determined if the enthalpy from the enthalpy sensor is greater than a setpoint (60% RH in this embodiment). If it is then the process flows to the relay to power the wheel is turned OFF for a period of time (600 seconds in this embodiment) at 214. Then the wheel is turned ON for a period of time (60 seconds in this embodiment) at 216. The process may then start over at 202.

If the enthalpy is not greater than 60% the "NO" leg is followed and the wheel is set to "ON" at 210. The process may then start over at 202.

If it is determined that the combined mode of operation is desired at 204, control may flow to 218 where another determination is made. At 208, a determination is made to see if the air temperature reading from the sensor is lower than a high setpoint (approximately 70° F./21° C.), and greater than a lower setpoint (approximately 40° F./4° C.) and if the enthalpy is greater than approximately 60%. If all of these determinations are true, the relay to power the wheel is turned OFF for a period of time (600 seconds in this embodiment) at 214. Then the wheel is turned ON for a period of time (60 seconds in this embodiment) at 216. The process may then start over at 202.

If the temperature or enthalpy is outside of the range defined in 218, the "NO" leg is followed and the wheel turned on at 220. The process may then start over at 202.

This process may reduce the dust and moisture accumulation on the wheel when conditions are proper.

The system comprises a method of controlling operation of an energy recovery ventilation wheel comprising, measuring the outside temperature with a temperature sensor, measuring the outside enthalpy with an enthalpy sensor, receiving a temperature signal at a processor from said temperature sensor, wherein said temperature signal is based at least in part on the outside temperature, receiving an enthalpy signal at said processor from said enthalpy sensor, wherein said enthalpy signal is based at least in part on the outside enthalpy, and controlling the operation of an energy recovery ventilation wheel by said processor, based at least in part on said temperature signal or said enthalpy signal or both, wherein said controlling comprises a sequence to reduce a moisture buildup on said energy recovery ventilation wheel.

It will be appreciated that although this method is shown in a particular order, any order of these steps are included in the scope of this disclosure.

Figure 3:
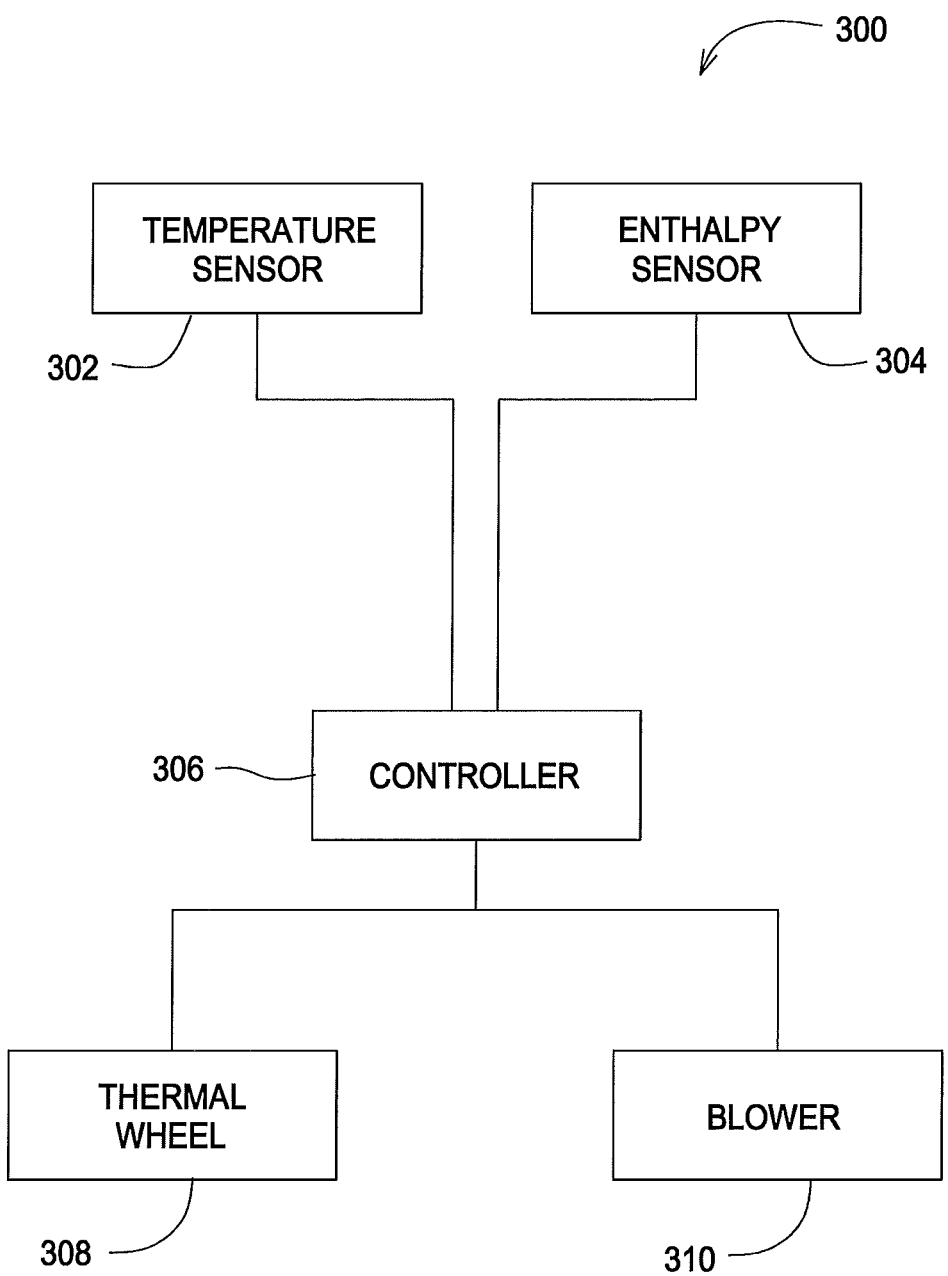
FIG. 3 is a schematic of an energy recovery ventilation control system, according to an embodiment.

FIG. 3 shows a system 300 which may be capable of the control of an ERV system, according to an embodiment. System 300 may include a temperature sensor 302, an enthalpy sensor 304, a controller 306, and thermal wheel 308, and one or more blowers 310. For example, blowers 310 would correspond to blowers 114a and 114b.

Temperature sensor 302 may be capable of sensing temperature and outputting a temperature signal generally corresponding to the temperature sensed. Similarly, enthalpy sensor 304 may be capable of sensing enthalpy of the environment it is in, and outputting an enthalpy signal based at least in part on the enthalpy sensed.

System 300 may also include a controller 306. Controller 306 may be capable of receiving the temperature and enthalpy signals and converting the signals to information which may be used by the controller 306. The controller 306 may use the information in calculation, comparisons, and/or in other programming. Controller 306 may include a processor capable of running a computer program or the like.

Controller 306 may also be capable of controlling the operation of thermal wheel 308 and blower(s) 310. Based at least in part on the temperature and enthalpy signals received, controller 306 may control the operation of wheel 308 and blower(s) 310. Controller 306 may also be capable of receiving setpoints for ranges of temperature and enthalpy. These setpoints may be used to determine the operation and control of the wheel 308 and blower(s) 310.

The system 300 may have an "economizer" mode of operation. This may be when the outside air does not need to be conditioned as much. In this mode of operation the wheel 308 may be pivoted out of the airstream, which may eliminate the pressure needed to drive air through the wheel 308, by blower(s) 310. This may reduce the amount of power used by the blower(s) 310.

When the wheel 308 is not in the airstream, dust and moisture may accumulate on the wheel 308. The present disclosure may include operation to reduce the dust and moisture buildup on the wheel. This may be a start/stop/jog sequence of driving the wheel. It might also include an enclosure for containing the wheel to protect it from the environment.

Although the present disclosure and its advantages have been described in detail, it should be understood that various changes, substitutions, and alterations can be made herein without departing from the spirit and scope of the disclosure as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. The disclosure disclosed herein may suitably be practiced in the absence of any element that is not specifically disclosed herein.

We claim:

1. A method of controlling operation of an energy recovery ventilation wheel, comprising:
   measuring an outside air temperature with a temperature sensor;
   measuring an outside air enthalpy with an enthalpy sensor;
   receiving a temperature signal at a processor from the temperature sensor, wherein the temperature signal is based at least in part on the outside air temperature;
   receiving an enthalpy signal at the processor from the enthalpy sensor, wherein the enthalpy signal is based at least in part on the outside air enthalpy; and
   controlling the operation of the energy recovery ventilation wheel with the processor, by:
      deactivating, with the processor, the energy recovery ventilation wheel for a first time period in response to the temperature signal, the enthalpy signal, or both, exceeding one or more set points; and
      in response to the energy recovery ventilation wheel being inactive for the first time period, reactivating, with the processor, the energy recovery ventilation wheel for a second time period, wherein reactivating the energy recovery ventilation wheel results in full, continuous rotation of the energy recovery ventilation wheel.

2. The method of claim 1, wherein the controlling further comprises activating a blower in the first time period while the energy recovery ventilation wheel is deactivated.

3. The method of claim 2, wherein the controlling further comprises reactivating the energy recovery ventilation wheel after at least the first time period such that a moisture buildup on the energy recovery ventilation wheel is removed.

4. The method of claim 3, wherein reactivating the energy recovery ventilation wheel occurs at least 10 minutes after the deactivating.

5. The method of claim 1, wherein the one or more set points comprise a temperature set point of approximately 40 degrees Fahrenheit.

6. A method of controlling operation of an energy recovery ventilation wheel, comprising:
   measuring an outside air temperature with a processor based on input from a temperature sensor;
   measuring an outside air enthalpy with the processor by combining input from a relative humidity sensor with the input from the temperature sensor; and
   controlling the energy recovery ventilation wheel using the processor, by:
      turning off the energy recovery ventilation wheel, with the processor, for a time period in response to the outside air temperature, the outside air enthalpy, or both, being within predetermined ranges; and
      after the time period, turning on the energy recovery ventilation wheel, with the processor, and causing full, continuous rotation of the energy recovery ventilation wheel.

7. The method of claim 6, wherein the controlling comprises activating a blower during the time period.

8. The method of claim 6, wherein, after the time period, turning on the energy recovery ventilation wheel, with the processor, and causing full, continuous rotation of the energy recovery ventilation wheel is configured to remove a moisture buildup on the energy recovery ventilation wheel.

9. The method of claim 8, wherein the time period is 10 minutes.

10. The method of claim 6, wherein the predetermined ranges comprise an outdoor air temperature range of approximately 40 degrees Fahrenheit to approximately 70 degrees Fahrenheit.

11. A method of controlling operation of an energy recovery ventilation wheel, comprising:
   measuring outside air parameters using one or more sensors;
   communicating the outside air parameters from the one or more sensors to a processor;
   processing the outside air parameters with the processor; and
   controlling the energy recovery ventilation wheel using the processor, by:
      opening a relay, with the processor, such that power to the energy recovery ventilation wheel is disconnected for a first time period when the outside air parameters are within predetermined ranges; and
      closing the relay, with the processor, after the first period, such that the power to the energy recovery ventilation wheel is connected, and the energy recovery ventilation wheel is reactivated for a second time period and rotates with full, continuous rotation.

12. The method of claim 11, wherein the controlling comprises activating a blower during the first time period.

13. The method of claim 11, wherein closing the relay, with the processor, after the first period, such that the power to the energy recovery ventilation wheel is connected, and the energy recovery ventilation wheel is reactivated for a second time period and rotates with full, continuous rotation is configured to remove a moisture buildup on the energy recovery ventilation wheel.

14. The method of claim 13, wherein the first time period is 10 minutes.

15. The method of claim 11, wherein the outside air parameters comprise an air temperature, and wherein the predetermined ranges comprise an air temperature range of approximately 40 degrees Fahrenheit to approximately 70 degrees Fahrenheit.

\* \* \* \* \*